United States Patent [19]

Sandiford et al.

[11] 4,031,958

[45] June 28, 1977

[54] PLUGGING OF WATER-PRODUCING ZONES IN A SUBTERRANEAN FORMATION

[75] Inventors: Burton B. Sandiford, Placentia; Robert K. Knight, Fullerton, both of Calif.

[73] Assignee: Union Oil Company of California, Brea, Calif.

[22] Filed: June 13, 1975

[21] Appl. No.: 586,731

[52] U.S. Cl. .................... 166/270; 166/292
[51] Int. Cl.² ........................ E21B 33/138
[58] Field of Search ............ 166/270, 292, 305 R, 166/293, 273, 294, 295, 300

[56] References Cited

UNITED STATES PATENTS

| | | | |
|---|---|---|---|
| 2,208,766 | 7/1940 | Lawton | 166/292 |
| 2,365,039 | 12/1944 | Andresen | 166/292 |
| 2,402,583 | 6/1946 | Andresen | 166/270 |
| 2,747,670 | 5/1956 | King et al. | 166/270 |
| 2,807,324 | 9/1957 | King et al. | 166/292 |
| 3,202,214 | 8/1965 | McLaughlin | 166/292 |
| 3,285,338 | 11/1966 | Boston | 166/270 |
| 3,307,629 | 3/1967 | Sharp | 166/292 |
| 3,342,262 | 9/1967 | King et al. | 166/292 |
| 3,396,790 | 8/1968 | Eaton | 166/270 |
| 3,530,937 | 9/1970 | Bernard | 166/270 |
| 3,656,550 | 4/1972 | Wagner et al. | 166/270 |
| 3,658,131 | 4/1972 | Biles | 166/292 |
| 3,805,893 | 4/1974 | Sarem | 166/270 |
| 3,871,452 | 3/1975 | Sarem | 166/270 |
| 3,882,938 | 5/1975 | Bernard | 166/270 |

*Primary Examiner*—Stephen J. Novosad
*Attorney, Agent, or Firm*—Richard C. Hartman; Dean Sandford; Gerald L. Floyd

[57] ABSTRACT

A method of selectively plugging permeable water-producing zones in a subterranean formation of nonuniform permeability comprising sequentially injecting into the formation (1) an aqueous solution of a first reactant material rendered more viscous than the subsequently injected liquids by the addition of a viscosity increasing agent, (2) a low viscosity inert aqueous spacer liquid, (3) a low viscosity aqueous solution containing a second reactant material which, on contact, will react with the first reactant material to produce an insoluble precipitate, (4) a low viscosity inert aqueous spacer liquid and (5) an additional amount of the aqueous solution of a first reactant material, which aqueous solution is optionally rendered more viscous than the previously injected aqueous solution containing the second reactant material by the addition thereto of a viscosity increasing agent.

25 Claims, No Drawings

PLUGGING OF WATER-PRODUCING ZONES IN A SUBTERRANEAN FORMATION

BACKGROUND OF THE INVENTION

1. Field of the Invention

This invention relates to the treatment of subterranean formations of nonuniform permeability, and more particularly concerns an improved method for selectively plugging the more permeable water flow channels of an earth formation. The method of this invention is especially useful in promoting more uniform fluid injection patterns, such as are desirable in the secondary recovery of petroleum by displacement with flood water, and in achieving water shutoff in producing wells.

2. Description of the Prior Art

Since only a portion of the oil contained in a petroleum reservoir can be recovered by primary methods, it has become conventional practice to employ various secondary and tertiary recovery techniques to produce additional quantities of oil not economically recoverable by primary methods. Of the various secondary and tertiary recovery methods available, one of the most widely practiced techniques is the displacement of oil from the reservoir with a driving fluid such as flood water injected for that purpose. Normally, in carrying out the flooding process, a series of input wells spaced apart from one or more producing wells are drilled into an opened to the oil-producing strata. The injection well locations with reference to the production wells are selected to afford a desired flood pattern, the selected pattern depending in part upon field conditions, the location of existing wells, and the operator's preference. Aqueous drive fluid, such as water, brine, or a viscous aqueous polymer solution, is forced into the input wells under pressure, and out into the surrounding oil-bearing strata towards the producing well or wells. While waterflooding has been rather widely practiced in recent years, it is not without considerable operating problems and economical limitations, particularly those associated with low oil recoveries in proportion to the amount of water injected. Various surfactant and solvent floods have been proposed as means for recovering additional quantities of oil over that recoverable by conventional waterflooding. However, these processes face serious operating problems when practiced in heterogeneous formations containing strata or channels having permeabilities substantially higher than the bulk of the formation.

One of the major problems encountered in a flooding operation is breakthrough of the flooding medium from the flood front to the producing well relatively early in the displacement process, and rapidly increasing producing water/oil ratios following the initial breakthrough. These difficulties result from the displacing medium channeling or fingering through the oil-bearing structure to the producing well, thus bypassing large zones of the oil-bearing strata. The reason for the channeling of the flooding medium to the producing wells and the resulting low oil recovery is due, in part, to the peculiar structure of the oil-bearing strata. Underground oil reservoirs, in most cases, consist of layers of sand or rock and, since no reservoir rock is perfectly uniform in composition and structure, the permeability will vary across the rock face or stratum. Also, fractures, cracks, vugs and other anomalies can promote channeling of the displacement fluid.

In the normal flooding operation, maximum oil recovery is obtained when the driven fluid builds up in a wide bank in front of the driving fluid which moves uniformly towards the producing well. To keep this bank of oil intact, and constantly moving towards the producing well, a substantially uniform permeability must exist throughout the strata. If this uniform permeability does not exist, or is not provided, the flooding fluid will seek the areas of high permeability, and channeling occurs with the consequent loss of some driving fluid energy and the appearance of excessive amounts of driving fluid in the producing well. Moreover, as the more permeable strata are depleted, the driving fluid has a tendency to follow channels and further increase consumption of the flooding media to the point where the process becomes uneconomical. This maximum limit, in terms of recovered oil, can be as high as 100 barrels of driving fluid per barrel of oil. It is of course desirable to operate at much lower driving fluid to oil ratios, and preferably not more than 15, and normally a maximum of 5 to 10 barrels of driving fluid per barrel of recovered oil is considered an acceptable operating condition, particularly where the driving fluid is a low cost agent such as flood water.

While a uniform flood front with reduced fingering can be obtained in some formations with a drive fluid rendered more viscous by the addition of various water-soluble polymers, or other materials capable of imparting higher viscosity to the flood water, viscous waterflooding is often ineffective in formations having severe heterogeneity as the mobility of the flood water cannot be economically reduced sufficiently to prevent or substantially restrict channeling of the flooding medium. Also, smaller volumes of aqueous polymer solution are sometimes injected into a heterogeneous reservoir to divert subsequently injected flooding media into the less permeable strata. However, such treatments are often ineffective or only partially effective is highly stratified formations.

Where a heterogeneous formation is flooded, it is usually found that the flood water or other flooding medium introduced into the injection well will enter the various strata open to the well at different flow rates depending upon the permeability of the individual strata relative to the permeabilities of the other strata in the formation. A water injection well of this type is said to exhibit a nonuniform injection profile. Heretofore, it has been considered that nonuniform injection profiles were symptomatic of channeling and the resulting poor flood water conformance. Accordingly, it was believed that selective plugging or other treatment to improve or correct the injection profile would ameliorate channeling and result in improved flood water conformance and increased oil recovery. However, most commercially practical selective plugging treatments affect the permeability of the strata only at the well face or for a few feet distance from the well. Since adjacent strata are often in fluid communication throughout all or a substantial part of the formation subjected to flooding, cross flow between the various strata exists and severe channeling develops even through a substantially uniform injection profile is obtained. Thus, in many applications, treatment of the injection wells to improve the water injection profiles has no demonstrable effect on oil recovery. Hence, need exists for an improved flooding process for use in heterogeneous formations that will minimize channeling of the flooding medium or bypassing of large areas of the formation, or for a method for improving the effectiveness of the conventional selective plugging processes to obtain these goals.

Another problem associated with the production of oil from oil-bearing formations containing highly permeable water channels communicating the production well with a water zone is the intrusion of water into the well. Not only does this water intrusion cause production and disposal problems, but more importantly the beneficial effect of the natural water drive is at least in part lost thereby adversely affecting oil recovery. It is advantageous to at least partially plug the more permeable water channels so as to render the formation more uniformly permeable and to increase the sweep efficiency of the water drive, or alternatively to shut off the water intrusion. Heretofore, selective plugging of these water channels has presented great difficulty, it being necessary to effect at least a partial water plug without adversely affecting the permeability of the formation for oil production.

Thus, many processes have been proposed for plugging high permeability and/or water-producing zones wherein there is injected into formations containing such zones a wide variety of viscous solutions and/or plug-forming solutions. However, in many instances adequate plugging of such zones has not been achieved.

In one previously used conventional method of permeability adjustment within a formation by the separate injection of reactive chemical solutions, there is sequentially injected into a formation: (1) a first aqueous chemical solution which may or may not contain a thickener, (2) an inert spacer liquid and (3) a second aqueous chemical solution which will react with the first aqueous chemical solution to form a solid precipitate upon contact therewith. In another previously used conventional method there are injected into a formation a number of cycles of material, each cycle comprising: (1) a first aqueous chemical solution, (2) an inert spacer liquid and (3) a second aqueous chemical solution which reacts with the first aqueous chemical solution to form a solid precipitate as described above. In both of the previously described methods the injected fluids move out into the formation in more or less circular bands from the injection or input well, the symmetry of the bands depending upon the uniformity of the structure. The injected solutions tend to preferentially enter the more permeable water channels. As the bands of solution move outwardly, the chemical solution bands gradually approach each other as the spacing medium band narrows due to the geometric relationship of the distance of the band from the well. At some point in the formation there is mixing of the first aqueous chemical solution and the second aqueous chemical solution. When this occurs a solid precipitate forms which at least partially plugs this zone. As the most permeable channels become partially plugged, fingering of the solutions into other somewhat less permeable zones increases so that ultimately the formation is rendered more uniformly permeable.

Thus, in all methods of permeability adjustment by the separate injection of reactive chemical solutions, it is necessary to avoid mixing of the two reactive solutions and the resulting precipitate formation until the solutions are positioned in the more permeable zones of the formations. When precipitation does occur, it is desired that an effective plug be formed. Formation of a plug in the proper location which is strong enough to be capable of withstanding the pressure of encroaching formation water or injected fluids have proven difficult. The method of the instant invention results in more effective mixing of the reactive solutions in the formation; hence, formation of an especially strong plug capable of effectively plugging the high permeability zones.

Accordingly, a principal object of this invention is to provide a method for controlling the permeability of a subterranean formation of nonuniform permeability.

another object is to provide a method for reducing channeling in a flooding process of the flooding medium from an injection well to a producing well via a high permeability zone.

Still another object is to provide an improved method for selectively plugging water-producing zones in a subterranean formation.

A further object is to provide a method for plugging a relatively high permeability zone of a subterranean formation which method is effective regardless of the direction of flow of fluids through the formation.

Other objects, advantages and features will become apparent from the following description and appended claims.

SUMMARY OF THE INVENTION

A method for at least partially plugging a relatively permeable zone in a subterranean formation of nonuniform permeability comprising sequentially injecting into the formation via a well:
a. a polymer-thickened aqueous solution of a first reactive chemical,
b. a low viscosity inert aqueous spacer liquid,
c. a low viscosity aqueous solution containing a second reactive chemical capable of reacting with the first reactive chemical upon contact therewith to form a solid precipitate or gel,
d. a low viscosity inert aqueous spacer liquid, and
e. an aqueous solution of the first reactive chemical which solution may optionally contain a thickener.

The initial slug of polymer-thickened first reactive chemical may optionally be preceded by injection of a slug of polymer-thickened inert aqueous spacer liquid. Due to their wetting characteristics, the injected solutions preferentially pass into those strata having higher water permeabilities whereupon they become admixed and react to form gels or solid precipitates which are deposited in the higher permeability zones causing them to become at least partially plugged. As the permeability of these more permeable zones is reduced, the injected solutions tend to pass to a greater extent into the less permeable zones causing partial plugging therein. As a consequence, a formation containing strata or zones of nonuniform permeability with respect to water is rendered more uniformly permeable. The permeability control technique of this invention is particularly useful in conjunction with a waterflood or steam drive, wherein the permeability adjusting treatment can be periodically performed as necessary to achieve the desired uniformity. In another embodiment of the invention, the aforementioned plugging solutions are injected into a producing well in order to plug permeable water channels in communication therewith.

DESCRIPTION OF THE PREFERRED EMBODIMENTS

In the practice of the process of the instant invention, the polymer-thickened aqueous solution of a first reactive chemical is prepared by adding the reactive chemical to a dilute solution of a water-soluble polymer in fresh water or brine. A number of water-soluble polymers are known to decrease the mobility of water in porous media when dissolved therein in relatively dilute concentrations. Exemplary water-soluble polymeric materials that can be employed are relatively high molecular weight acrylic acid-acrylamide copolymers, acrylic acid-acrylamide-diacetone acrylamide terpolymers, partially hydrolyzed polyacrylamides, hydroxyethyl cellulose, carboxymethyl cellulose, polyacrylamides, polyoxyethylenes, modified starches, heteropolysaccharides obtained by the fermentation of starch derived sugar, polyvinyl alcohol, polyvinyl pyrolidone, and polystyrene sulfonates.

Many of the water-soluble polymers useful in the practice of this invention are characterized by a viscosity of at least 3 centipoises for a 0.1 percent by weight solution thereof in aqueous 3 percent by weight sodium chloride solution at 25° C. as determined with a Brookfield viscosimeter equipped with a UL adapter and operated at a speed of 6 rpm. However, it is to be recognized that other of the water-soluble polymers are effective in reducing the mobility of water in porous media, yet have little or only slight effect upon the viscosity of water.

A preferred water-soluble polymer useful as the mobility reducing agent in the first-stage injection is partially hydrolyzed polyacrylamide having between about 2 to about 67 percent of the carboxamide groups hydrolyzed to carboxyl groups, and which is characterized by a molecular weight of at least 500,000 and preferably 1,000,000 or more. Another preferred polymer having the desired viscosity increasing properties is acrylic acid-acrylamide copolymer of similar molecular weight. Still another preferred viscosity increasing agent is acrylic acid-acrylamide-diacetone acrylamide terpolymer.

The water-soluble polymers useful in this invention are inclusive of the polymers wherein the carboxyl groups are in the acid form and also such polymers wherein the carboxyl groups are in the salt form, provided that the salts are water-soluble. Thus, for example, the polymers can be employed in the form of the carboxylates of sodium, potassium, other alkali metal, or ammonium, or in the form of the mixed carboxylates of sodium, potassium, magnesium, calcium, and the like.

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the formation into which they are to be injected in water-sensitive or where fresh water is not available. In most instances, the mobility of the water can be reduced to the desired level by the addition of about 0.001 to about 1 weight percent of the polymer, and satisfactory results can often be obtained by the addition of 0.05 to 0.15 weight percent polymer.

Low viscosity liquids used in the process of this invention have viscosities of about 1 centipoise. The polymer-thickened aqueous solution has a viscosity in the range of from about 5 to about 100 centipoises.

In treating injection wells in which the plug-forming solutions move through the formation predominantly in one direction, away from the injection well, it is preferred that only the first slug of the aqueous solution of a first reactive chemical contain polymer thickener. The thickener tends to reduce the flow rate of this solution through the formation; thus, enabling the subsequently injected less viscous aqueous solution of the second reactive chemical to overtake and mix with this first injected solution. In treating producing wells the plug-forming solutions flow in one direction during the injection phase, i.e., away from the producing well which is temporarily used for injecting fluids. When the well is returned to production, the previously injected fluids tend to move in the opposite direction, i.e., back toward the producing well. Therefore, in treating producing wells it is desirable that both the first slug and the second slug of the aqueous solution of a first reactive chemical contain polymer thickener. Thus, regardless of the direction of movement of fluids in the formation, there is a tendency for the thickened aqueous solution of a first reactive chemical to be overrun by and mixed with the less viscous aqueous solution of the second reactive chemical. Chances for formation of a plugging precipitate are thereby increased.

There is some tendency for the polymer to be adsorbed onto the rock of the formation through which the polymer-thickened aqueous solution of a first reactive chemical passes. This adsorption results in an undesirable decrease in the viscosity of this solution. In a preferred embodiment of this invention, there is injected into the formation, ahead of the polymer-thickened aqueous solution of a first reactive chemical, a slug of polymer-thickened water. This latter solution both helps slow down the progress through the formation of the subsequently injected polymer-thickened aqueous solution of a first reactive chemical and also provides polymer for adsorption onto the formation rock, so that when subsequently injected polymer-thickened aqueous solution of a first reactive chemical passes through this portion of the formation, less polymer is adsorbed onto the formation from this subsequently injected solution.

Any of a wide variety of materials which react upon contact to form a gel or plugging precipitate can be used as the first reactive chemical and the second reactive chemical. Broadly speaking, the two reactive materials can be added in any sequence. It is preferred that the gelling agent be used as the first reactive chemical and the alkali metal silicate as the second reactive chemical as this procedure has been found to result in the formation of a more substantial gel. A preferred pair of materials are an alkali metal silicate and a gelling agent therefor, such as an acid or an acid-forming compound, a water-soluble ammonium salt, a lower aldehyde, an aluminum salt, or an alkali metal aluminate. Exemplary gelling agents are ammonium sulfate, formaldehyde, aluminum sulfate, ammonium bicarbonate, sodium aluminate, and acids such as the mineral acids, for example sulfuric acid and hydrochloric acid, and the lower molecular weight water-soluble organic acids. The alkali metal silicate reacts in the presence of the gelling agent to form a silica or silica alumina gel. Gelling occurs rapidly as soon as the two components are mixed together. However, the gel increases in strength with time. Thus, it is preferred that the well be shut-in for a few hours following placement of the treating solutions in the formation to allow the gel to increase in strength and form a better permeability-blocking material. In normal well operations, a few hours are required following placement of the above-described treating solutions to get the well ready for the next operation, such as production or injection of a fluid for secondary recovery. This normal shut-in time is sufficient for formation of a gel having adequate strength.

Sodium silicate is a preferred alkali metal silicate. Any sodium silicate having a ratio of silica to sodium oxide of from about 1.5:1 to about 4:1 by weight may be used. Preferably the ratio should be from about 3:1 to about 3.5:1. Ammonium sulfate is the preferred gelling agent. The concentration of alkali metal silicate in aqueous solution can range from between about 0.75 to about 25 weight percent. Preferably from between 2 to 15 weight percent is employed. The concentration of gelling agent in its aqueous solution can range from about 2.5 to about 10 weight percent, preferably from 3 to 7 weight percent. The concentration of gelling agent must be sufficient to cause gelation of the alkali metal silicate. The exact concentration varies depending upon the particular gelling agent employed. Gelation occurs when the gelling agent reduces the pH of the aqueous solution of an alkali metal silicate to a certain value. For example, an acid gelling agent will react with sodium silicate to form a gel when the pH of the silicate solution decreases to a value of about 7. Ammonium sulfate gelling agent reacts with sodium silicate to form a gel at about pH 8.7. Gelation generally occurs when only a portion of the slug of gelling agent-containing solution becomes admixed with a portion of the slug of alkali metal silicate-containing solution.

In the practice of the treating method of this invention, there is first injected into a heterogeneous or highly stratified reservoir optionally a slug of polymer-thickened water in an amount of about 1 to about 10 barrels per vertical foot of interval to be treated, preferably from about 2 to about 7 barrels per vertical foot. Next there is injected a quantity of a polymer-thickened aqueous solution of a first reactive chemical in an amount sufficient to penetrate into the more permeable strata of the reservoir a substantial distance from the well being used for injection. It is preferred that the aqueous solution penetrate into the more permeable strata a distance of at least 20 feet from the well, and more preferably a distance of about 50 feet. It should be understood that the injected solution will penetrate into the less permeable zones to a much lesser extent, the amount of solution entering each stratum depending upon the permeability of the individual stratum in relation to the permeabilities of all the strata.

The amount of this first slug of polymer-thickened aqueous solution of a first reactive chemical required to obtain the desired treatment will vary from well to well and can best be determined from a knowledge of the reservoir characteristics obtained from well logs, core analysis, injection profiles and tracer studies. Nevertheless, it is found that satisfactory results can often be obtained by the injection of about 1 to about 100 barrels of this solution per vertical foot of formation to be treated. A quantity of about 2 to about 20 barrels per vertical foot is preferred.

The injection of the first slug of polymer-thickened aqueous solution of a first reactive chemical is followed by a slug of inert spacer liquid. The preferred inert spacer liquid is fresh water. A slug of from about 1 to about 1000 barrels fresh water per vertical foot of interval to be treated is satisfactory. A slug of from about 5 to about 50 barrels per vertical foot is preferred.

The slug of inert spacer liquid is followed by a slug of a low viscosity aqueous solution of a second reactive chemical. A slug of from about 2 to about 1000 barrels per vertical foot of interval to be treated is satisfactory. A slug of from about 5 to about 50 barrels per vertical foot is preferred.

The slug of a low viscosity aqueous solution of a second reactive chemical is followed by another slug of inert spacer liquid. The size of this slug is about the same as the size of the first slug of inert spacer liquid.

This slug of inert spacer liquid is followed by another slug of an aqueous solution of a first reactive chemical which aqueous solution may or may not contain a polymer thickener depending upon the particular method being employed. The size of this slug is about the same as the size of the first slug of aqueous solution of a first reactive chemical.

Finally, a slug of inert spacer liquid is injected to displace all treating solutions out of the tubing and out into the formation. Preferably the volume of this slug of inert spacer liquid is the volume needed to displace all treating fluids out into the formation plus about 5 barrels of vertical foot of interval to be treated. The well is then preferably shut in for about 10 hours to allow the plug to form.

The flooding or producing operation conducted following the treatment of this invention is practiced in a conventional manner.

The invention is further described by the following examples, in which Example 1 is illustrative of a prior art method and Example 2 is a comparable example illustrative of a specific mode of practicing the invention. The examples are not intended as limiting the scope of the invention as defined by the appended claims.

EXAMPLE 1

The selective plugging of the more water permeable channels of a permeable formation by one preferred prior art method is illustrated in the following laboratory test. A synthetic core of Nevada No. 135 sandstone standstone having a diameter of 2 inches, a length of 36 inches and a pore volume of 410 milliliters (mls.) is mounted in a horizontal position in a conventional core holder and saturated with an aqueous brine containing 2.8 weight percent sodium chloride, 0.3 weight percent calcium chloride and 0.1 weight percent magnesium chloride. There is sequentially injected into the core: (1) 300 mls. of the previously described aqueous brine at a pressure differential of 10 pounds per square inch (psi); (2) 100 mls. of a first slug of an aqueous solution containing 500 ppm sodium chloride and 6 weight percent ammonium sulfate at 10 psi; (3) 20 mls. water spacer at 10 psi; (4) 200 mls. of an aqueous solution containing 500 ppm sodium chloride and 9 weight percent sodium silicate solution at 10 psi; (5) 20 mls. water spacer at 10 psi; (6) 130 mls. of a second slug of an aqueous solution containing 500 ppm sodium chloride and 6 weight percent ammonium sulfate at 10 psi; (7) less than 5 mls. water spacer at 10 psi; (8) less than 5 mls. water spacer at 20 psi; (9) less than 5 mls. water spacer at 30 psi; (10) less than 5 mls. water spacer at 40 psi, and (11) less than 5 mls. water spacer at 50 psi. The sodium silicate solution used above is an aqueous commercial sodium silicate containing about 37.6 weight percent sodium silicate and having a silica to sodium oxide ($SiO_2/Na_2O$) ratio of 3.22 marketed by Philadelphia Quartz Company under the designation N-grade sodium silicate solution.

The results of these tests are reported in the Table. It is noted that with this prior art method there is little decrease in flow rate; hence, little plugging, until the second slug of aqueous brine solution containing ammonium sulfate is injected. A firm plug forms at a differential pressure of 10 psi but the plug begins to move when a differential pressure of 20 to 50 psi is applied across the core.

EXAMPLE 2

This example illustrates one mode of carrying out the present invention. Example 1 is repeated except that the core has a pore volume of 420 mls. and the first slug of aqueous brine solution containing ammonium sulfate also contains 0.15 weight percent Calgon 454, a partially hydrolyzed polyacrylamide having between 16 and 20 percent of the carboxamide groups hydrolyzed to carboxyl groups and a molecular weight of from 5 to 10 million.

The results of this test are also reported in the Table. It is again noted that significant plugging of the core occurs only when the second slug of aqueous brine solution containing ammonium sulfate is injected into the core. The addition of polymer to the first slug of aqueous brine solution containing ammonium sulfate results in a substantially lower flow rate, hence a stronger plug.

TABLE

COMPARATIVE PLUG-FORMING TESTS IN A SYNTHETIC CORE

| Fluid Injected | Differential Injection Pressure (psi) | Flow Rate Through Core (mls./sec.) |
|---|---|---|
| Example 1 | | |
| 300 mls. brine[1] | 10 | 0.265 |
| 100 mls. 6 weight percent ammonium sulfate in 500 ppm sodium chloride brine | 10 | 0.267 |
| 20 mls. water spacer | 10 | 0.294 |
| 200 mls. 9 weight percent N-grade sodium silicate[2] in 500 ppm sodium chloride brine | 10 | 0.228 |
| 20 mls. water spacer | 10 | 0.225 |
| 130 mls. 6 weight percent ammonium sulfate in 500 ppm sodium chloride brine | 10 | 0.015 |
| < 5 mls. water spacer | 10 | 0 |
| < 5 mls. water spacer | 20 | 0.0095 |
| < 5 mls. water spacer | 30 | 0.016 |
| < 5 mls. water spacer | 40 | 0.042 |
| < 5 mls. water spacer | 50 | 0.104 |
| Example No. 2 | | |
| 300 mls. brine[1] | 10 | 0.206 |
| 100 mls. 6 weight percent ammonium sulfate in 500 ppm sodium chloride brine containing 0.15 weight percent Calgon 454 polymer[3] | 10 | 0.177 |
| 20 mls. water spacer | 10 | 0.168 |
| 200 mls. 9 weight percent N-grade sodium silicate[2] in 500 ppm sodium chloride brine | 10 | 0.107 |
| 20 mls. water spacer | 10 | 0.081 |
| 108 mls. 6 weight percent ammonium sulfate in 500 ppm sodium chloride brine | 10 | 0[4] |
| < 5 mls. water spacer | 10 | 0 |
| < 5 mls. water spacer | 20 | 0 |
| < 5 mls. water spacer | 30 | 0 |
| < 5 mls. water spacer | 40 | 0.0005 |
| < 5 mls. water spacer | 50 | 0.0002 |

[1]Brine comprises an aqueous solution containing 2.8 weight percent sodium chloride, 0.3 weight percent calcium chloride and 0.1 weight percent magnesium chloride.
[2]N-grade sodium silicate contains about 37.6 weight percent sodium silicate, has a silica to sodium oxide ratio of 3.22 and is marketed by Philadelphia Quartz Company.
[3]Calgon 454 polymer is a partially hydrolyzed polyacrylamide having between 16 and 20 percent of the carboxamide groups hydrolyzed to carboxyl groups and a molecular weight of from 5 to 10 million.
[4]The flow rate is 0.264 mls./sec. until 108 mls. solution is injected and then the flow rate drops to 0.

It is found that with the prior art method of Example 1, the flow rate of fluids through the core drops to 0 after injection of the second slug of aqueous ammonium sulfate solution when it is attempted to inject water into the core at a pressure of 10 psi. This indicates that a plugging gel is formed in the core. When the pressure is increased to 20 psi and above, some flow through the core is established. This indicates that the gel formed lacks substantial strength and is being pushed through the core by the water. With the method of this invention of Example 2, the flow rate through the core also drops to 0 after injection of the second slug of aqueous ammonium sulfate solution when it is attempted to inject water into the core at a pressure of 10 psi. This portion of the results is similar to the previous example. However, in the present example increasing the pressure to 20 psi and then to 30 psi causes no flow. It is only when the pressure is raised to 40 psi that a very low flow rate through the core takes place. This indicates that the plugging gel formed by the method of the present invention is substantially stronger than the comparable plugging gel formed by the prior art method.

EXAMPLE 3

A production well in the South San Joaquin area of California has a 67 foot thick zone containing viscous oil and a 17 foot thick subjacent zone containing water separated by a 5 foot thick impermeable zone. The well has been producing 141 barrels per day (B/D) water and 1 B/D oil. In an attempt to reduce the ratio of water-to-oil being produced, the well is given a treatment wherein the following solutions are sequentially injected into the well at an injection rate of 1.75 barrels per minute: (a) 25 barrels of an aqueous solution containing 612 pounds ammonium sulfate gelling agent and 13 pounds Calgon 454 polymer, a partially hydrolyzed polyacrylamide having between 16 and 20 percent of the carboxamide groups hyrolyzed to carboxyl groups and a molecular weight of from 5 to 10 million, (b) 30 barrels fresh water spacer, (c) 100 barrels of an aqueous solution containing 10,000 pounds N-grade sodium silicate, which is a 37 weight percent aqueous solution of sodium silicate having a silica to sodium oxide ratio of 3.22, (d) 30 barrels fresh water spacer, (e) 100 barrels of an aqueous solution containing 2400 pounds ammonium sulfate gelling agent and (f) 30 barrels fresh water spacer. The well is shut in for 16 hours. When returned to production the well produces 88 B/D water and 8 B/D oil. The treatment is considered successful since the water production rate is reduced and the oil production rate is sharply increased.

EXAMPLE 4

A 55 foot thick oil-producing heterogeneous formation in south Texas is penetrated by an injection well and four surrounding production wells. The formation is being waterflooded and is producing via one of the production wells at the rate of 180 B/D water and 5 B/D oil. A chemical tracer injected into the injection well is observed to reach the production well in 9.5 hours. This indicates that the injected waterflood media is fingering through the formation between the injection well and the producing well. It is desired to treat this injection well to plug the higher permeability channels through which most of the injected waterflood media is sweeping through the formation. This plugging treatment will force subsequently injected waterflood media into the less permeable portions of the formation which contain unrecovered oil.

The injection well is given a treatment wherein the following solutions are sequentially injected into the well at an injection rate of 2 barrels per minute: (a) 30 barrels of an aqueous solution containing 735 pounds ammonium sulfate gelling agent and 31 pounds hydroxyethyl cellulose, (b) 40 barrels fresh water spacer, (c) 100 barrels of an aqueous solution containing 10,000 pounds N-grade sodium silicate, (d) 40 barrels fresh water spacer, (e) 100 barrels of an aqueous solution containing 2400 pounds ammonium sulfate gelling agent and (f) 40 barrels fresh water spacer. The well is then shut in for 8 hours. The waterflood medium is injected into the injection well at the same rate as before the plugging treatment. One week following the plugging treatment production at the production well is 53 B/D water and 29 B/D oil. A chemical tracer injected into the injection well at this time does not reach the production well in one month at which time testing for the chemical tracer is discontinued. These results indicate that plugging of the most permeable portions between the injection well and the production well has occurred and that the injected waterflood medium is penetrating the less-permeable oil-containing zones.

While particular embodiments of the invention have been described, it will be understood, of course, that the invention is not limited thereto since many modifications can be made, and it is intended to include within the invention any such modifications as fall within the scope of the claims.

The invention having been thus described, we claim:

1. A method for selectively plugging the permeable water channels of a subterranean formation of nonuniform permeability penetrated by a well, which comprises:
    a. introducing a polymer-thickened aqueous solution of a first reactive chemical into said well communicating with said formation, said solution containing a polymer thickening agent added in an amount sufficient to render the solution substantially more viscous than the subsequently injected liquids;
    b. followed by introducing a low viscosity inert aqueous spacer liquid into said well;
    c. followed by introducing a low viscosity aqueous solution of a second reactive chemical which, in the formation, contacts and reacts with said first reactive chemical to produce an insoluble precipitate or gel;
    d. followed by introducing a second low viscosity inert aqueous spacer liquid; and
    e. followed by introducing a second aqueous solution of said first reactive chemical which, in the formation, contacts and reacts with the aqueous solution of a second reactive chemical introduced in step (c) to produce an insoluble precipitate or gel.

2. The method defined in claim 1 wherein the second aqueous solution of the first reactive chemical injected in step (e) also contains a polymer thickening agent.

3. The method defined in claim 1 wherein said low viscosity liquids have viscosities of about 1 centipoise and wherein the viscous aqueous solutions have a viscosity within the range of from about 5 to about 100 centipoises.

4. The method defined in claim 1 wherein said polymer thickening agent is a partially hydrolyzed polyacrylamide.

5. The method defined in claim 1 wherein said polymer thickening agent is hydroxyethyl cellulose.

6. The method defined in claim 1 wherein the first reactive chemical is a gelling agent for the alkali metal silicate and the second reactive chemical is an alkali metal silicate.

7. The method defined in claim 6 wherein the gelling agent for the alkali metal silicate is ammonium sulfate and the alkali metal silicate is sodium silicate.

8. The method defined in claim 1 wherein the first reactive chemical is an alkali metal silicate and the second reactive chemical is a gelling agent for the alkali metal silicate.

9. The method defined in claim 8 wherein the alkali metal silicate is sodium silicate and the gelling agent for the alkali metal silicate is ammonium sulfate.

10. The method defined in claim 1 wherein there is first introduced into the formation a slug of polymer-thickened water.

11. The method defined in claim 1 wherein the polymer-thickened aqueous solution of a first reactive chemical contains from about 2.5 to about 10 weight percent gelling agent for an alkali metal silicate and from about 0.001 to about 1 weight percent polymer thickening agent, the low viscosity aqueous solution of a second reactive chemical contains from about 0.75 to about 25 weight percent alkali metal silicate and the aqueous solution of a first reactive chemical injected in step (e) contains from about 2.5 to about 10 weight percent gelling agent for an alkali metal silicate and, optionally, from about 0.001 to about 1 weight percent polymer thickening agent.

12. The method defined in claim 1 wherein in steps (b) and (d) the low viscosity inert spacer liquiid is introduced in an amount of about 1 to about 1,000 barrels per vertical foot of interval to be treated.

13. The method defined in claim 1 wherein in steps (b) and (d) the low viscosity inert spacer liquid is introduced in an amount of about 5 to about 50 barrels per vertical foot of interval to be treated.

14. A method for selectively plugging the permeable water channels of a subterranean formation of nonuniform permeability penetrated by a well, which comprises sequentially:
    a. introducing into said well communicating with said formation a slug of from about 1 to about 100 barrels per vertical foot of formation to be treated of an aqueous solution containing from about 0.001 to about 1 weight percent polymer thickening agent and from about 2.5 to about 10 weight percent of a first reactive chemical;

b. introducing a slug of from about 1 to about 1,000 barrels per vertical foot of a low viscosity inert aqueous spacer liquid;

c. introducing a slug of from about 2 to about 1,000 barrels per vertical foot of a low viscosity aqueous solution of from about 0.75 to about 25 weight percent of a second reactive chemical which in the formation contacts and reacts with said first reactive chemical to produce an insoluble precipitate or gel;

d. introducing a second slug of from about 1 to about 1,000 barrels per vertical foot of a low viscosity inert aqueous spacer liquid; and e. introducing a second slug of from about 1 to about 100 barrels per vertical foot of formation to be treated of an aqueous solution containing from about 0.001 to about 1 weight percent polymer thickening agent and from about 2.5 to about 10 weight percent of said first reactive chemical which, in the formation, contacts and reacts with the aqueous solution of a second reactive chemical introduced in step (c) to produce an insoluble precipitate or gel.

15. The method defined in claim 14 wherein in steps (b) and (d) the low viscosity inert spacer liquid is introduced in an amount of about 5 to about 50 barrels per vertical foot of interval to be treated.

16. In the recovery of oil from a subterranean oil-bearing formation of nonuniform permeability by flooding the formation with an aqueous displacement fluid injected under pressure through an injection well so as to drive oil toward at least one spaced production well, an improved method of selectively adjusting the permeability of the formation, which comprises:

a. discontinuing the injection of the displacement fluid;

injecting through said injection well a slug of from about 1 to about 100 barrels per vertical foot of formation to be treated of an aqueous solution containing from about 0.001 to about 1 weight percent polymer thickening agent and from about 2.5 to about 10 weight percent gelling agent for an alkali metal silicate;

c. followed by injecting a slug of from about 1 to about 1,000 barrels per vertical foot of a low viscosity inert aqueous spacer liquid;

d. followed by injecting a slug of from about 2 to about 1,000 barrels per vertical foot of a low viscosity aqueous solution containing from about 0.75 to about 25 weight percent of alkali metal silicate which, in the formation, contacts and reacts with the aqueous solution of polymer and gelling agent injected in step (b) to produce an insoluble precipitate or gel;

e. followed by injecting a second slug of from about 1 to about 1,000 barrels per vertical foot of a low viscosity inert aqueous spacer liquid;

f. followed by injecting a slug of from about 1 to about 100 barrels per vertical foot of an aqueous solution containing from about 2.5 to about 10 weight percent gelling agent for an alkali metal silicate which, in the formation, contacts and reacts with the aqueous solution of alkali metal silicate injected in step (d) to produce an insoluble precipitate or gel; and g. resuming the injection of the displacement fluid.

17. The method defined in claim 16 wherein the gelling agent for the alkali metal silicate is ammonium sulfate.

18. The method defined in claim 16 wherein the alkali metal silicate is sodium silicate.

19. The method defined in claim 16 wherein there is first injected through the injection well following the discontinuing of the injection of the displacement fluid a slug of from 1 to 10 barrels per vertical foot of formation to be treated of polymer-thickened water.

20. The method defined in claim 16 wherein in steps (c) and (e) the low viscosity inert spacer liquid is introduced in an amount of about 5 to about 50 barrels per vertical foot of interval to be treated.

21. In the production of oil via a production well penetrating a subterranean oil-bearing formation of nonuniform permeability wherein an excessive amount of water is produced along with the oil, an improved method of selectively plugging the water-producing zones, which comprises:

a. discontinuing production via the production well;

b. injecting through said production well a slug of from about 1 to about 100 barrels per vertical foot of formation to be treated of an aqueous solution containing from about 0.001 to about 1 weight percent polymer thickening agent and from about 2.5 to about 10 weight percent gelling agent for an alkali metal silicate;

c. injecting a slug of from about 1 to about 1,000 barrels per vertical foot of a low viscosity inert aqueous spacer liquid;

d. injecting a slug of from about 2 to about 1,000 barrels per vertical foot of a low viscosity aqueous solution containing from about 0.75 to about 25 weight percent alkali metal silicate;

e. injecting a second slug of from about 1 to about 1,000 barrels per vertical foot of a low viscosity inert aqueous spacer liquid;

f. injecting a slug of from about 1 to about 100 barrels per vertical foot of an aqueous solution containing from about 2.5 to about 10 weight percent gelling agent for an alkali metal silicate; and g. resuming production of the well.

22. The method defined in claim 21 wherein the aqueous solution injected in step (f) also contains from about 0.001 to about 1 weight percent of polymer thickening agent.

23. The method defined in claim 21 wherein the gelling agent for the alkali metal silicate is ammonium sulfate.

24. The method defined in claim 21 wherein the alkali metal silicate is sodium silicate.

25. The method defined in claim 21 wherein there is first injected through the injection well following the discontinuing of production a slug of from 1 to 10 barrels per vertical foot of formation to be treated of polymer-thickened water.

* * * * *